United States Patent
Oestreich

(10) Patent No.: US 7,865,208 B2
(45) Date of Patent: Jan. 4, 2011

(54) METHOD FOR ADJUSTING THE OUTPUT POWER FOR A RADIO LINK WHICH USES TWO DIFFERENT CHANNELS, AND CORRESPONDING RADIO STATION

(75) Inventor: Stefan Oestreich, Holzkirchen (DE)

(73) Assignee: Nokia Siemens GmbH & Co. KG, Munich (DE)

( * ) Notice: Subject to any disclaimer, the term of this patent is extended or adjusted under 35 U.S.C. 154(b) by 830 days.

(21) Appl. No.: 10/593,778

(22) PCT Filed: Feb. 17, 2005

(86) PCT No.: PCT/EP2005/050710

§ 371 (c)(1),
(2), (4) Date: Jul. 26, 2007

(87) PCT Pub. No.: WO2005/093965

PCT Pub. Date: Oct. 6, 2005

(65) Prior Publication Data

US 2007/0287388 A1 Dec. 13, 2007

(30) Foreign Application Priority Data

Mar. 26, 2004 (DE) .................. 10 2004 014 998

(51) Int. Cl.
*H04B 7/00* (2006.01)
(52) U.S. Cl. .................. 455/522; 455/69; 370/335
(58) Field of Classification Search ............ 455/522, 455/69, 67.13; 370/335
See application file for complete search history.

(56) References Cited

U.S. PATENT DOCUMENTS

| | | | |
|---|---|---|---|
| 6,148,208 A | 11/2000 | Love | |
| 6,173,162 B1 * | 1/2001 | Dahlman et al. | 455/69 |
| 2003/0045319 A1 * | 3/2003 | Sarkar et al. | 455/522 |

FOREIGN PATENT DOCUMENTS

| | | |
|---|---|---|
| CN | 1267410 A | 9/2000 |
| DE | 198 23 504 A1 | 12/1998 |
| DE | 103 06 170 A1 | 9/2004 |
| DE | 103 06 171 A1 | 11/2004 |
| EP | 0 917 321 A1 | 5/1999 |
| EP | 1 089 458 A2 | 4/2001 |
| EP | 1 111 809 A2 | 6/2001 |
| EP | 1 207 629 A2 | 5/2002 |
| RU | 2 127 951 | 3/1999 |
| WO | 92/21196 | 11/1992 |
| WO | WO 98/00928 | 1/1998 |
| WO | 98/58461 | 12/1998 |
| WO | WO 02/067606 A2 | 8/2002 |

* cited by examiner

*Primary Examiner*—Nay A Maung
*Assistant Examiner*—Angelica M Perez
(74) *Attorney, Agent, or Firm*—Staas & Halsey LLP

(57) ABSTRACT

First of all, data (D) of the link is transmitted via a first channel (CH1), while the quality of the data transmission is adjusted by correspondingly varying output power (P). Data (D) of the link is then transmitted via a second channel (CH2), wherein the output power (P) is initially set to a value (P2) which is dependent upon the value (P1) of the output power at the end of transmission via the first channel (CH1) and upon a modification of the reception conditions of the link during the changeover from the first channel (CH1) to the second channel (CH2).

11 Claims, 2 Drawing Sheets

METHOD FOR ADJUSTING THE OUTPUT POWER FOR A RADIO LINK WHICH USES TWO DIFFERENT CHANNELS, AND CORRESPONDING RADIO STATION

CROSS REFERENCE TO RELATED APPLICATIONS

This application is based on and hereby claims priority to International Application No. PCT/EP2005/050710 filed on Feb. 17, 2005 and German Application No. 10 2004 014 998.4 filed on Mar. 26, 2004.

BACKGROUND

The invention relates to a method for adjusting the output power for a radio link which uses two different channels, and a corresponding radio station.

In radio communications systems data is transmitted over the air by electromagnetic waves. A mobile radio telecommunication system is an example of a radio communications system. Currently the most widespread standard for mobile radio telecommunication systems is the GSM (global system of mobile communication) standard, which is classed as the second generation of mobile telecommunication systems. The third generation of mobile telecommunication systems is being implemented at the present time. This class includes for example UMTS (universal mobile telecommunications standard) with its two variants TDD (time division duplex) and FDD (frequency division duplex).

The UMTS standard provides for a CDMA (code division multiple access) method of access, in which different links are distinguished from one another by different spreading codes and/or different scrambling codes. One or more channels are allocated to a link. A spreading code and a scrambling code are allocated to each channel. A code known as a primary scrambling code and a plurality of secondary scrambling codes are available. All channels with the same scrambling code are orthogonal to one another. So for example all channels using the primary scrambling code are orthogonal to one another. On the other hand channels using the primary code are not orthogonal to channels using one of the secondary scrambling codes. The simultaneous use of channels with orthogonal codes causes less mutual interference than the use of codes that are not orthogonal to one another. At the same time it is necessary to be aware that although orthogonality may exist transmitter-side, unfavorable transmission conditions (multi-path propagation) can have an adverse effect receiving-side.

When a mobile station is operating a link on a first channel, it is often necessary for said station to run a check on other channels, for example in order to enable a changeover to another channel or to another radio cell. For this reason UMTS provides for mobile stations to be changed over to a mode known as compressed mode, in which data needing to be transmitted to a mobile station is transmitted during a shortened period of time only, so that the mobile station concerned can perform measurements for the remainder of the time. So that the data intended for transmission can be transmitted during this shortened time period, compressed mode briefly uses a spreading code with a spread factor that is smaller than before the changeover to compressed mode and after the end of compressed mode. While so doing it is useful to increase transmission output power in inverse proportion to the reduction in spread factor, in order to ensure approximately the same reception quality.

SUMMARY

One potential object is to specify an advantageous method for adjusting the output power for a radio link which uses two different channels.

The inventor proposes a method for adjusting the output power for transmitting data of a link in a radio communications system provides that first of all, data of the link is transmitted via a first channel, while the quality of the data transmission is adjusted by correspondingly varying output power, data of the link is then transmitted via a second channel, wherein the output power is initially set to a value which is dependent upon the value of the output power at the end of transmission via the first channel and upon a modification of the reception conditions of the link during the changeover from the first channel to the second channel.

This advantageously makes it possible for the output power to be selectively adjusted to a measured value at the start of data transmission via the second channel. By taking account of the output power value at the end of data transmission via the first channel, the results of adjusting the transmission quality via the first channel are used to determine the output power for the second channel. By also taking account of a change in the reception conditions during the changeover from one channel to the other, the initial output power for transmission via the second channel can be determined from the reception conditions prevailing on each channel in a selective and therefore much more accurate manner. The output power is not therefore adjusted by a predetermined factor dependent on for example the ratio of spread factors in the case of CDMA channels, as happens in the UMTS standard described above. Instead the factor to be used is dependent on the reception conditions prevailing on the two channels.

The method is suitable for use in any radio system with mobile or static radio stations, but particularly in mobile telecommunication systems. Any radio resources can be allocated to the channels, such as spreading codes, scrambling codes, time slots or frequency bands, depending on the multiplex method used (CDMA, TDMA, FDMA or any combination of these).

The term reception conditions refers to all conditions that affect reception at the receiving station but are not caused solely by the transmitting station when it transmits the data of the link concerned. Then for example interference conditions at the receiving station are included under this definition, but not the transmitter-side use of different spread factors in each of the two channels. Fading is also included under the said definition, since this is not caused by the transmitting station.

According to one embodiment, a change in the reception conditions is accounted for by taking account of interference on both channels when setting the initial value of the output power on the second channel. If interference on the second channel is stronger than on the first channel, the initial output power for the second channel needs to be set higher than when the interference on the second channel is lower than on the first channel or when the interference is of equal strength in both cases.

One example of interference being present at different strengths on the two channels is when one of the channels is using a primary scrambling code and the other channel is using a secondary scrambling code according to the UMTS standard. In practice there is preferably a greater number of links using the primary scrambling code per radio cell of a UMTS mobile telecommunication system than the number of links using a secondary scrambling code. Since the channels that use the primary code are orthogonal to one another, they generate no mutual interference and do not disturb one another. On the other hand since they are not orthogonal to the channels with secondary codes, their use disturbs links that use secondary codes. Although channels with secondary codes also disturb the primary codes, the interference is less because they are not so numerous. So as a rule the interference in links using a secondary scrambling code is stronger than in links using a primary scrambling code. The method now makes it possible in such cases to take account of the difference in the interference for channels with primary or secondary codes by increasing the initial output power for the second channel by an appropriate correction factor if the first channel is using a primary scrambling code and the second channel a secondary code, or by reducing the initial output power in the opposite case.

A further embodiment thus provides for the method to be used on a CDMA radio communications system in which different links can optionally be differentiated by different spreading codes and/or different scrambling codes and in which different scrambling codes are used for each of the two channels of the link.

The first scrambling code can then preferably be a primary scrambling code and the second scrambling code can be a secondary scrambling code, wherein when channels are being allocated within a radio communications system primary scrambling codes are used in preference to secondary scrambling codes, and channels with primary scrambling codes are orthogonal to one another but not orthogonal to channels with secondary scrambling codes. In UMTS, adjacent radio cells use different primary scrambling codes and different secondary scrambling codes.

According to a further embodiment, which can be provided as an alternative or addition to the previously mentioned embodiment, a change in the reception conditions when the channels of the link are changed is accounted for when setting the initial value of the output power on the second channel by taking into consideration the radio propagation conditions within the radio coverage area in which the data is being transmitted. The propagation conditions of a link (such as fading, channel conditions, speed of the stations taking part in the link) also affect the actual reception conditions of a link. In the case handled by the previously described embodiment, the better reception conditions brought about in a channel using the primary scrambling code due to the orthogonality of channels with the primary scrambling code can be partially or completely ruined because the channel concerned is subject to strong fading. Fading affects particularly the receiving-side orthogonality characteristics of a link. In the case of strong fading, the advantages of using orthogonal channels transmitter-side can therefore be at least partially canceled out.

Fading is dependent on the multi-path propagation of a radio signal. The multi-path propagation depends largely on the topography of the area in which the radio transmission is taking place. The topography in which a receiving station is located can therefore be used to form an opinion on the amount of fading likely to be encountered. Such opinions are then dependent on the location of the receiver. For example assumptions can be made about the different fading in each radio cell, but it is also possible for the fading conditions in sub-sections of a radio cell to be different again.

It can be advantageous if fading conditions are taken into account for the specific link under consideration. For example information about the location of the receiving station or the relative speed between the transmitting and receiving stations can be used for this purpose. This is because fading can be dependent on both location and speed.

Moreover in the case of a bi-directional link for determining the propagation conditions in one direction (and thus also for determining its reception conditions) information about the propagation conditions in the opposite transmission direction can be taken into account. That is to say, the transmitter for the data of the link uses the signals transmitted to it by the receiver of the data to determine the fading conditions for its own reception and assumes that the fading conditions in the opposite direction of transmission are similar.

According to one embodiment, a change in the reception conditions is accounted for by taking account of the receiving-side orthogonality characteristics of at least one of the two channels when setting the initial value of the output power on the second channel. For example consideration can be given to whether the receiving-side orthogonality of one of the two channels, which are using a scrambling code, is relatively good or relatively bad. As previously mentioned, the receiving-side orthogonality of a channel using a primary scrambling code to channels that are also using the said primary scrambling code can be negated in the presence of strong fading, for example.

According to an advantageous embodiment, a change in the reception conditions is accounted for when setting the initial value of the output power on the second channel, by taking account of the utilization load on the radio coverage area in which the data is being transmitted. This makes it possible to estimate the interference ratio for both channels of the link. For the previously mentioned case, in which a primary and a secondary scrambling code are used, the differences between the interference on the two channels are greater the more heavily the respective radio cell is loaded. Since links predominantly use the primary scrambling code in UMTS, interference is increased for channels with the secondary scrambling code, whereas it stays about the same for channels with the primary scrambling code, due to the orthogonality between the latter channels.

According to a further embodiment, spreading codes with different spread factors are used for each of the two channels, and in addition the ratio between the spread factors of the two channels is taken into account for the initial value of the output power on the second channel. That is, in addition to taking account of the different reception conditions on the two channels, consideration is also given to the fact that the use of another spread factor must give rise to an adjustment of the instantaneous output power. In this case the adjustment of the output power due to changed reception conditions can compensate for the adjustment due to changed spread factors (at least in part) or give rise to a yet higher adjustment to the output power.

In a further embodiment, data transmission is interrupted while the second channel is being used for the link, in order to enable further channels to be measured during the transmission pause on the subscriber station receiving the data of the link, reverting to the first channel after the data has been transmitted via the second channel. This enables the method to be used for the UMTS compressed mode mentioned above, for example.

The station for transmitting the data of the links has the components needed to perform the method and its various embodiments. The station can be any transmitting station of any radio communications system. In particular it can be a base station of a UMTS mobile telecommunication system.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
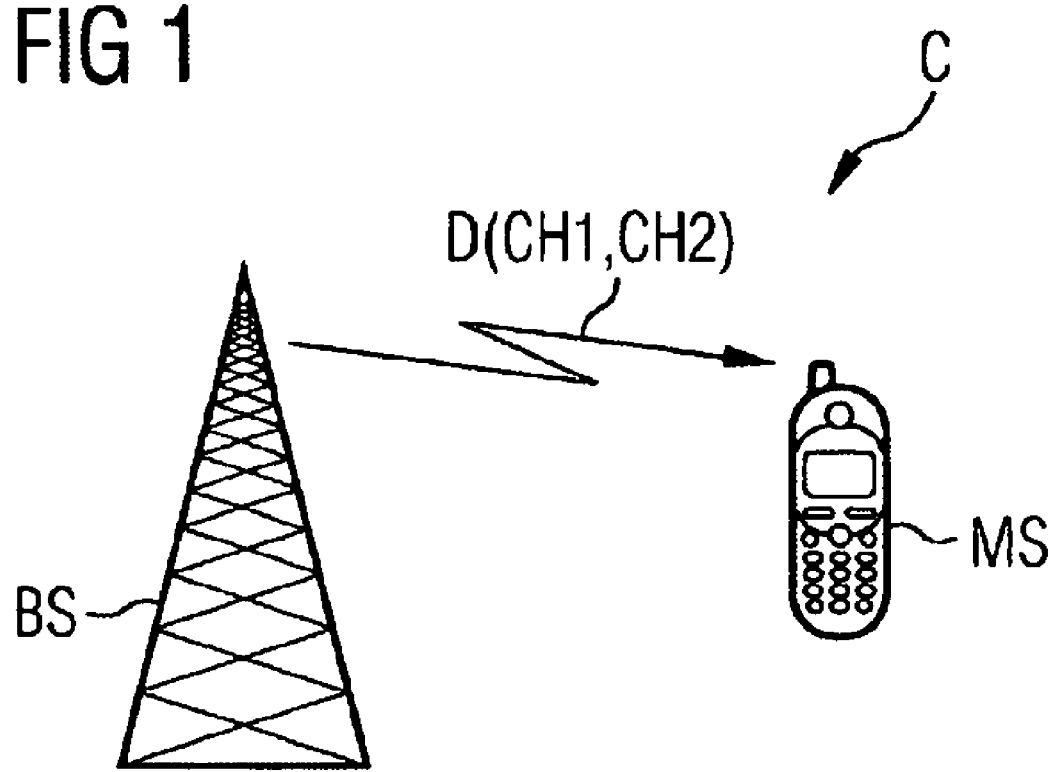
FIG. 1 An exemplary embodiment of the proposed method and radio station.

Reference will now be made in detail to the preferred embodiments of the present invention, examples of which are illustrated in the accompanying drawings, wherein like reference numerals refer to like elements throughout.

FIG. 1 shows part of a UMTS FDD mobile telecommunication system, although the method and radio station can also be used on any other mobile telecommunication systems and indeed on any other radio communications systems with static or mobile radio stations. The figure shows, within a radio cell C, a base station BS (known as "Node B" in UMTS) which provides the coverage for the radio cell, and a mobile station MS to which the data D of a link is to be transmitted by the base station BS. While this link is operating it is changed over from a first channel CH1 to a second channel CH2.

Figure 2:
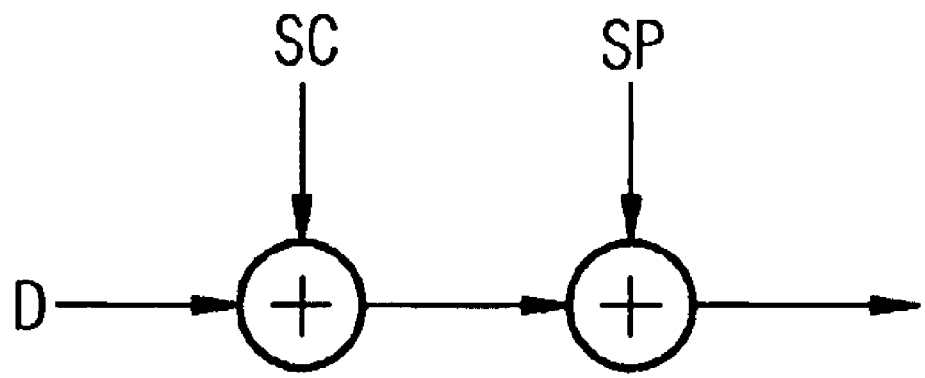
FIG. 2 The transmitter-side processing of data for the exemplary embodiment from FIG. 1 and FIG. 3 Two time charts for the exemplary embodiment from FIG. 1.

FIG. 2 is a diagram showing how, in UMTS, the data of the link D is first scrambled with the aid of a scrambling code SC transmitter-side (that is, at the base station BS) after which the scrambled data is then spread with the aid of a spreading code SP. During spreading each bit in the scrambled data D is spread using a spreading-code specific number of chips. The spread data is then transmitted to the receiver. Despreading and descrambling of the incoming data D then takes place receiving-side (in the mobile station MS).

Figure 3A:
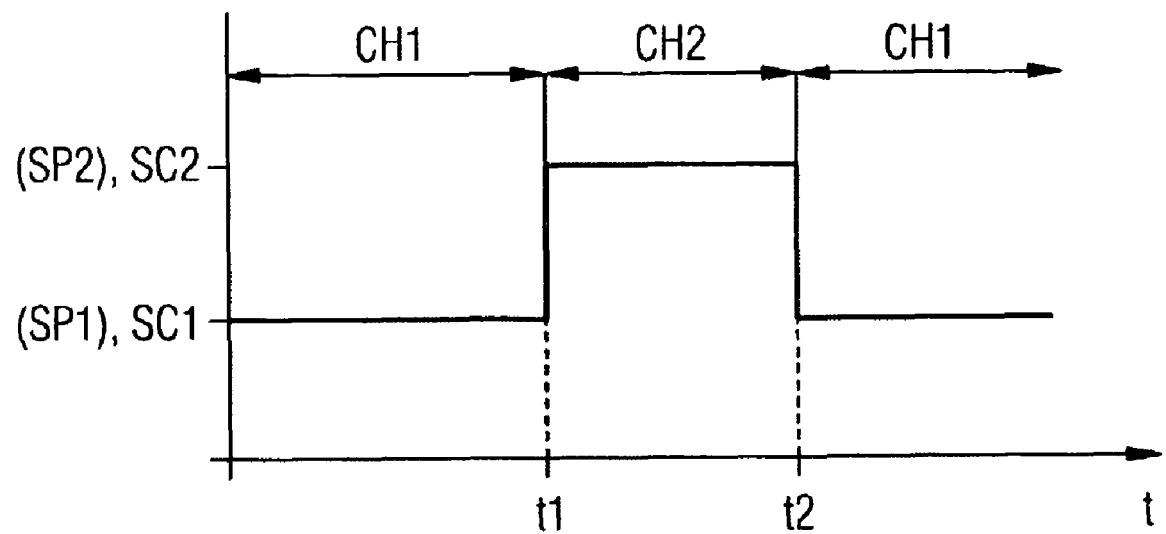

FIG. 3A shows that before a first instant t1 and after a second instant t2, a first scrambling code SC1 is used for the link between the base station BS and the mobile station MS. Between the two instants t1 and t2 however, a second scrambling code SC2 is used. Here the first scrambling code SC1 is a primary scrambling code of the UMTS FDD mobile telecommunication system concerned and the second scrambling code is a secondary scrambling code. These scrambling codes are allocated to the radio cell C covered by the base station BS. It is further assumed that a first spreading code SP1 is used for the first channel CH1 and a second spreading code SP2 is used for the second channel CH2. In this first exemplary embodiment these have the same spread factors (that is the same number of chips).

Figure 3B:
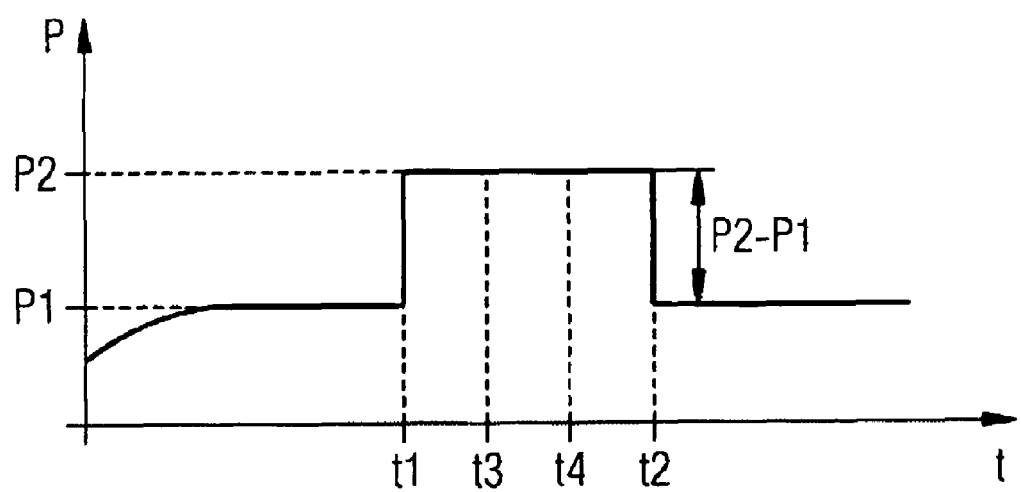

FIG. 3B shows the evolution of the output power P of the base station BS for transmitting the data D from FIG. 1 via the two channels CH1, CH2. Before the first instant t1 the reception quality on the mobile station MS is adjusted (by a known UMTS FDD method) by appropriately controlling the output power P of the base station BS. For the sake of simplicity it is assumed that the output power P is held constant at a first value P1 for a certain length of time before the first instant t1. After the instant t1 at which the changeover from the first channel CH1 to the second channel CH2 takes place, the output power P is increased to a second value P2. The level of the increase applied to the output power P in this exemplary embodiment is dependent on the difference between the interference on the first channel CH1 and that on the second channel CH2. As mentioned above, the interference is different on the two channels CH1, CH2 due to the different orthogonality characteristics of these other channel-to-channel links in the radio cell C, which likewise use the primary or secondary scrambling code. As also mentioned above, channels with the primary scrambling code, which are preferably used in the radio cell C, are orthogonal to one another, but are not orthogonal to channels with the secondary scrambling code.

The good orthogonality of the channels with the primary code can however be affected by propagation conditions, especially fading. These channels are indeed orthogonal transmitter-side (at the base station BS), but due to multi-path propagation the signals of different links using the primary scrambling code are no longer orthogonal to one another receiving-side (at the mobile station MS). This can give rise to interference between channels using the primary code. Consequently the interference conditions for the first and second channel can become alike, so that at the two instants t1 and t2 only a very slight difference needs to be provided between the first value P1 and the second value P2 of the output power P. In order to determine the strength of the fading or the extent of the deterioration in the propagation conditions for the link, the base station BS and/or the mobile station MS have the ability to determine factors that allow conclusions to be drawn about the propagation conditions, especially the fading. This means in the present case, the ability for determining the speed of the mobile station MS, since fading is dependent on speed. For example the propagation conditions can be determined by a channel evaluation. It is possible to determine from this among other things the number of propagation paths and the speed of the stations taking part in the link.

In other exemplary embodiments, a mechanism for determining the position of the mobile station MS within the radio cell C can also be provided, since fading can also be dependent on position. Depending also on information about the topography of the radio cell C (since fading is affected by the topography) it can then be decided (for example in the base station BS or a central unit of the radio communications system such as a base station controller) how strong the fading is and from this extent to which the orthogonality of the first channel CH1 using the first scrambling code SC1 is currently being adversely affected relative to on the other hand channels using the primary scrambling code.

After the second instant t2 in FIG. 3B, where a further changeover to the first channel CH1 occurs, the output power P is again reduced by an appropriate amount to the first value P1. For simplicity's sake it is assumed that the reception conditions do not change in the meantime (that is, between the two instants t1 and t2), so that the output power P need not be changed. Otherwise the reception quality at the mobile station MS is likewise adjusted during this interval by adjusting the output power P of the base station BS.

In a second exemplary embodiment, the two spreading codes SP1, SP2 of the two channels CH1, CH2 have different spread factors. The output power P at the start of transmission via the second channel CH2 is then adjusted by an additional factor corresponding to the ratio between the spread factors. This can give rise to a situation in which, on the changeover from the first to the second channel, the output power P is increased more strongly or less strongly than the case shown in FIG. 3B. It is even possible for overcompensation to occur and instead of being increased, the output power is actually reduced. On changing from the second channel CH2 to the first channel CH1 the output power is also correspondingly adjusted in this exemplary embodiment.

In the second exemplary embodiments it is possible that when using the second channel CH2 there is a changeover to the compressed mode of the UMTS FDD standard. In this event the spread factor is reduced relative to that used in the first channel CH1, that is to say, the spreading is now using a smaller number of chips. Consequently for this reason alone the output power P must now be increased. This gives rise to the need for a stronger increase in the output power at the first instant t1 than in the case of the first exemplary embodiment. In this second exemplary embodiment the data transmission from the base station BS to the mobile station MS is temporarily interrupted between a third instant t3 and a fourth instant t4 during the compressed mode when using the second channel CH2, so that the mobile station MS can measure other channels during this interval.

In the exemplary embodiments under consideration here, the base station BS can determine the utilization load on its radio cell C in terms of channels (in other exemplary embodiments this function can also be performed by another unit of the radio communications system). This is performed most advantageously by separately determining the utilization in terms of the primary scrambling codes on the one hand and the secondary scrambling codes on the other. This can be done in particular by determining how the total output power of the base station is distributed over channels with primary and secondary scrambling codes (as a rule this information is present in the base station). Since as a rule channels with primary scrambling codes are predominantly used, determining the total output power in a radio cell can make it possible to form a conclusion about the interference in the channels with primary or secondary codes. With this knowledge it is then possible to decide on the strength of the interference for channels using the primary scrambling code (first scrambling code SC1), that is in particular for the first channel CH1, as a ratio of the interference for channels with the secondary scrambling code (second scrambling code SC2), that is in particular for the second channel CH2. This ratio is used in order to determine the extent of the change in the output power P at the instants t1, t2, that is, the switchover between the two channels CH1, CH2.

In other exemplary embodiments it is also possible to determine the interference for the two channels CH1, CH2 directly at the mobile station MS by taking appropriate measurements, for example by determining the signal-to-noise ratio or the signal-to-interference ratio.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for adjusting the output power for transmitting data of a link in a radio communications system, in which
   first of all, data of the link is transmitted via a first channel, while the quality of the data transmission is adjusted by correspondingly varying output power,
   then data of the link is transmitted via a second channel, wherein the output power is initially set to a value which is dependent upon a value of the output power at the end of transmission via the first channel and upon a modification of the reception conditions of the link during the changeover from the first channel to the second channel.

2. A method as claimed in claim 1, in which a change in the reception conditions is accounted for by taking account of interference on the first and second channels when setting the initial value of the output power on the second channel.

3. A method as claimed in one of the preceding claims, in which a change in the reception conditions is accounted for when setting the initial value of the output power on the second channel, by taking account of propagation conditions within the radio coverage area in which the data is being transmitted.

4. A method as claimed in claim 3, in which
   the propagation conditions are specific to the link.

5. A method as claimed in claim 1, in which
   a change in the reception conditions is accounted for when setting the initial value of the output power on the second channel, by taking account of the utilization load on the radio coverage area in which the data is being transmitted.

6. A method as claimed in claim 1, in which
   a change in the reception conditions is accounted for by taking account of the receiving-side orthogonality characteristics of at least one of the two channels when setting the initial value of the output power on the second channel.

7. A method as claimed in claim 1,
   which is used on a CDMA radio communications system, in which different links can optionally be differentiated by different spreading codes and/or different scrambling codes,
   and in which different scrambling codes are used for each of the two channels of the link.

8. A method as claimed in claim 7, in which
   the first scrambling code is a primary scrambling code and the second scrambling code is a secondary scrambling code,
   wherein when channels are being allocated within the radio communications system, the primary scrambling code is used in preference to the secondary scrambling code.

9. A method as claimed in one of claims 7 and 8, in which
   spreading codes with different spread factors are used for the two channels,
   and in addition the ratio between the spread factors of the two channels is taken into account for setting the initial value of the output power on the second channel.

10. A method as claimed in one of claims 7 and 8, in which
    data transmission is interrupted while the second channel is being used for the link, in order to enable further channels to be measured during the transmission pause on the subscriber station receiving the data of the link,
    then reverting to the first channel after the data has been transmitted via the second channel.

11. A station for transmitting data of at least one link in a radio communications system,
    with means for transmitting data of the link via a first channel,
    with means for adjusting data transmission quality via the first channel by correspondingly varying output power,
    with means for then transmitting data of the link via a second channel,
    with means for initially setting the output power on the second channel to a value which is dependent on a value of the output power at the end of transmission via the first channel and upon a modification of the reception conditions of the link during the changeover from the first channel to the second channel.

* * * * *